United States Patent
Hsien

(10) Patent No.: US 6,899,600 B1
(45) Date of Patent: May 31, 2005

(54) WRENCH MANUFACTURING PROCESS

(76) Inventor: Chin-Ching Hsien, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/791,612

(22) Filed: Mar. 3, 2004

(51) Int. Cl.⁷ .................................................. B24B 1/00
(52) U.S. Cl. ............................................ 451/54; 451/32
(58) Field of Search ............................. 451/54, 32, 34, 451/35, 37

(56) References Cited

U.S. PATENT DOCUMENTS 5,083,008 A  *  1/1992  Zerver ................. 219/121.69
6,666,111 B1  *  12/2003  Hsien ............................ 81/60
6,666,112 B2  *  12/2003  Hu .............................. 81/63.1

* cited by examiner

*Primary Examiner*—Dung Van Nguyen

(57) ABSTRACT

A wrench manufacturing process for manufacturing a rotational-tube wrench comprises the steps of forging, annealing, rolling, punching, drawing, polishing, surface grinding, CNC rough cutting, thermal treatment, vibrating, electroplating, CNC fine cutting and assembling. The additional steps of thermal treatment and CNC or MC fine cutting not only enhance the structural toughness of the wrench but also guarantee high degree of roundness for the receptacle space thereof. The CNC or MC fine cutting also provides the inner wall of the receptacle space with fine tool marks so that the confinement strength of a rotational tube without ratchets therein can be significantly enlarged.

2 Claims, 2 Drawing Sheets

WRENCH MANUFACTURING PROCESS

FIELD OF THE INVENTION

The present invention relates to wrench manufacturing processes, more particularly to a rolling wrench manufacturing process.

DESCRIPTION OF THE PRIOR ART

The wrench manufacturing processes of the prior art generally comprise the steps of (1) forging, (2) annealing, (3) rolling, (4) punching, (5) drawing, (6) polishing, (7) surface grinding, (8) vibrating and (9) assembling. The wrench initially takes shape in the step of forging. It then goes through the step of annealing so as to become softer for the subsequent cutting. The carbide materials attached on the wrench are taken off in a rolling barrel in the step of rolling. The wrench then goes through the steps of punching and drawing to take the final shape. The curved surfaces of the wrench are polished in the step of polishing, whereas the flat surfaces thereof are processed in the step of surface grinding. Finally, the wrench goes through the step of vibrating in which it is fine processed and electroplated. Finally, the wrench is coupled with other accessories to form an ordinary wrench.

However, the conventional manufacturing process for an ordinary wrench is not suitable for wrenches of special purposes. For example, a unidirectional rotational-tube wrench, functioning similar to a unidirectional ratchet wrench, has a rolling tube restricted to unidirectional rotational motion by the engagement of the outer surface of the tube with the inner surface of a circular receptacle space on the wrench body. Therefore, it is necessary that the inner surface of the receptacle space is hard, perfectly circular and of high frictional coefficient. The conventional process can make a wrench identical in outlook to a unidirectional rolling-tube wrench, but the above requirements for confining a rotational tube cannot be attained. Therefore, the wrench will be either easily deformed due to its lack of hardness, or have uneven stress around the receptacle space with the tube due to not being perfectly circular or be short of grasp force due to insufficient frictional coefficient. A unidirectional rotational-tube wrench thereby made cannot last long.

SUMMARY OF THE INVENTION

Accordingly, the primary objective of the present invention is to provide a wrench manufacturing process comprising the steps of: (a) forming a roughcast of a wrench by means of thermal forging; (b) annealing said roughcast of a wrench so as to soften the roughcast to facilitate subsequent processing; (c) performed a rolling process; namely to rub said roughcast of a wrench against sand granules in a rolling barrel, so as to remove carbide materials attached on said roughcast during said step of annealing; (d) shaping said roughcast of a wrench to a predetermined shape; (e) CNC rough cutting, whereby a receptacle space in a front section of said roughcast of a wrench is cut to attain a predetermined size; (f) cutting a receptacle space in a front section of said roughcast of a wrench to has a predetermined size by CNC rough cutting or MC cutting; (g) enhancing the structural toughness of said roughcast of a wrench by a heating process so that the structure is capable of resisting the stress caused by twisting a fixed object; (h) fining a surface of said roughcast of a wrench by chemical vibrations so that the roughcast is suitable for being electroplated; (i) coating said surface of said roughcast of a wrench with a protective layer to resist oxidation and attrition; (j) eliminating slight deformations due to said step of thermal treatment, of said receptacle space of said roughcast of a wrench by performing CNC cutting or MC fine cutting so that said receptacle space fits required degree of roundness, and an inner wall of said receptacle space is left with fine tool marks for providing a better frictional effect with a part set to be installed therein; and (k) coupling said roughcast of a wrench with said part set within said receptacle space thereof and being then locking said roughcast with said part set by a locking member.

A unidirectional rolling-tube wrench thus formed has the following advantages. The steps of thermal treatment and CNC or MC fine cutting guarantee high degree of roundness for the receptacle space of the wrench, which cannot be attained otherwise. The step of thermal treatment of this novel wrench manufacturing process enhances the toughness of the wrench. The step of CNC or MC fine cutting not only enhances the roundness of the receptacle space but also provides the inner wall of the receptacle space with fine tool marks so that the confinement strength of the inserted part set therein is significantly enlarged.

The various objects and advantages of the present invention will be more readily understood from the following detailed description when read in conjunction with the appended drawings.

DETAILED DESCRIPTION OF THE PREFERRED EMBODIMENT

Figure 1:
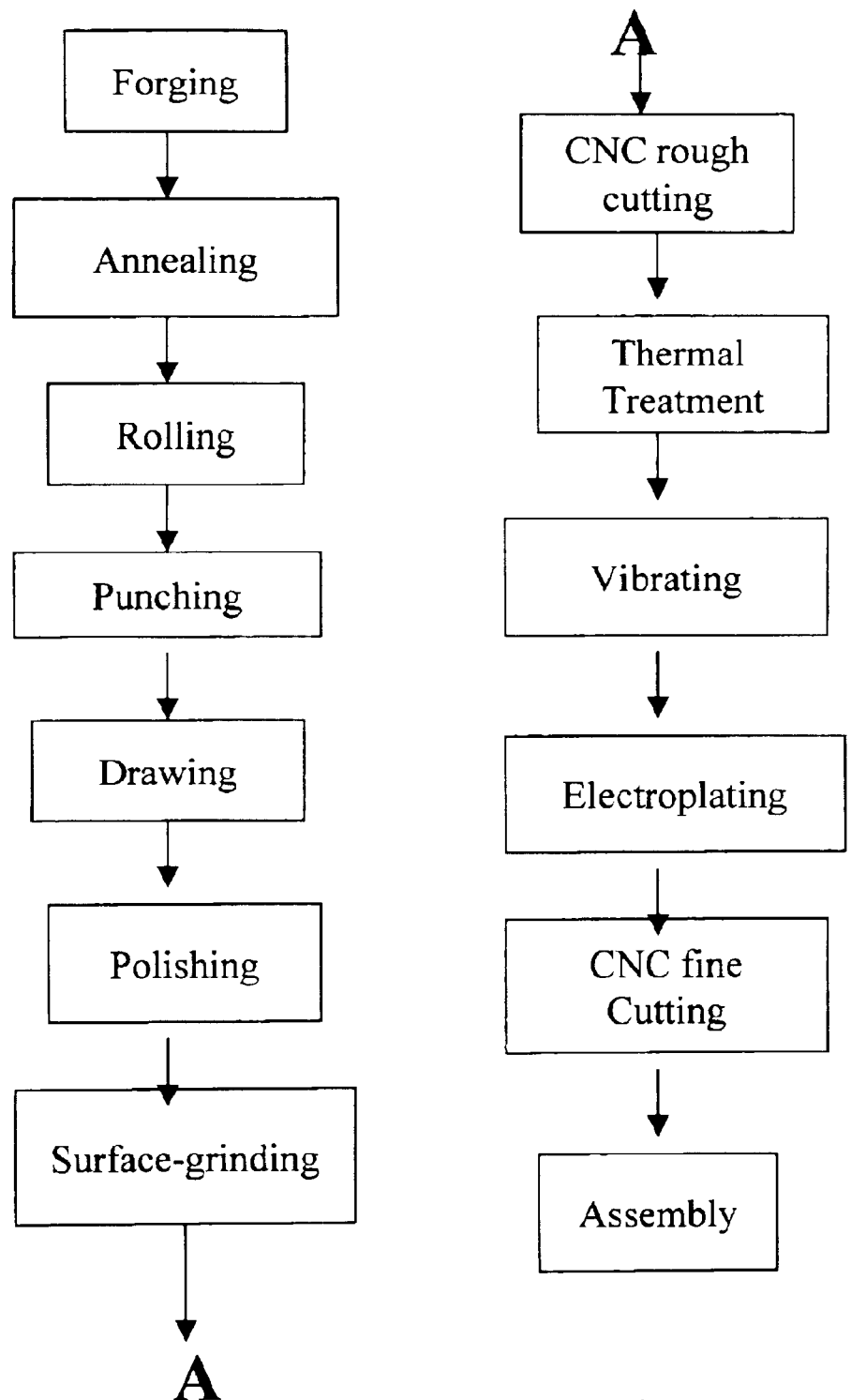
FIG. 1 is the flow chart of a wrench manufacturing process according to the present invention.

Referring to FIG. 1, a wrench manufacturing process according to the present invention comprises the steps of forging, annealing, rolling, external processing, CNC rough cutting, thermal treatment, vibrating, electroplating, CNC fine cutting and assembling. The step of external further includes punching, drawing, polishing and surface grinding. All the steps are specified as follows.

1. In the step of forging, thermal forging forms the roughcast of a unidirectional rotational-tube wrench.
2. In the step of annealing, the hardness of the roughcast is reduced to facilitate the subsequent processing.
3. In the step of rolling, the roughcast rubs against sand granules in a rolling barrel, so that the carbide materials attached on the roughcast are removed.

The external processing comprises the following four steps.

4. In the step of punching, the receptacle space of the roughcast is formed for that the workload of the subsequent cuttings is reduced.
5. In the step of drawing, the portions of the roughcast needed to process are stretched to the right size.
6. In the step of polishing, the rugged parts on the roughcast left form the forging are removed, and the curved surface portions of the roughcast are polished so that all wrenches thereby produced have a uniform outlook.
7. In the step of surface grinding, the portions of the roughcast that need to be CNC processed are flattened to a predetermined standard.
8. In the step of CNC rough cutting, the receptacle space in the front section of the roughcast attains a predetermined dimension.

Figure 2:
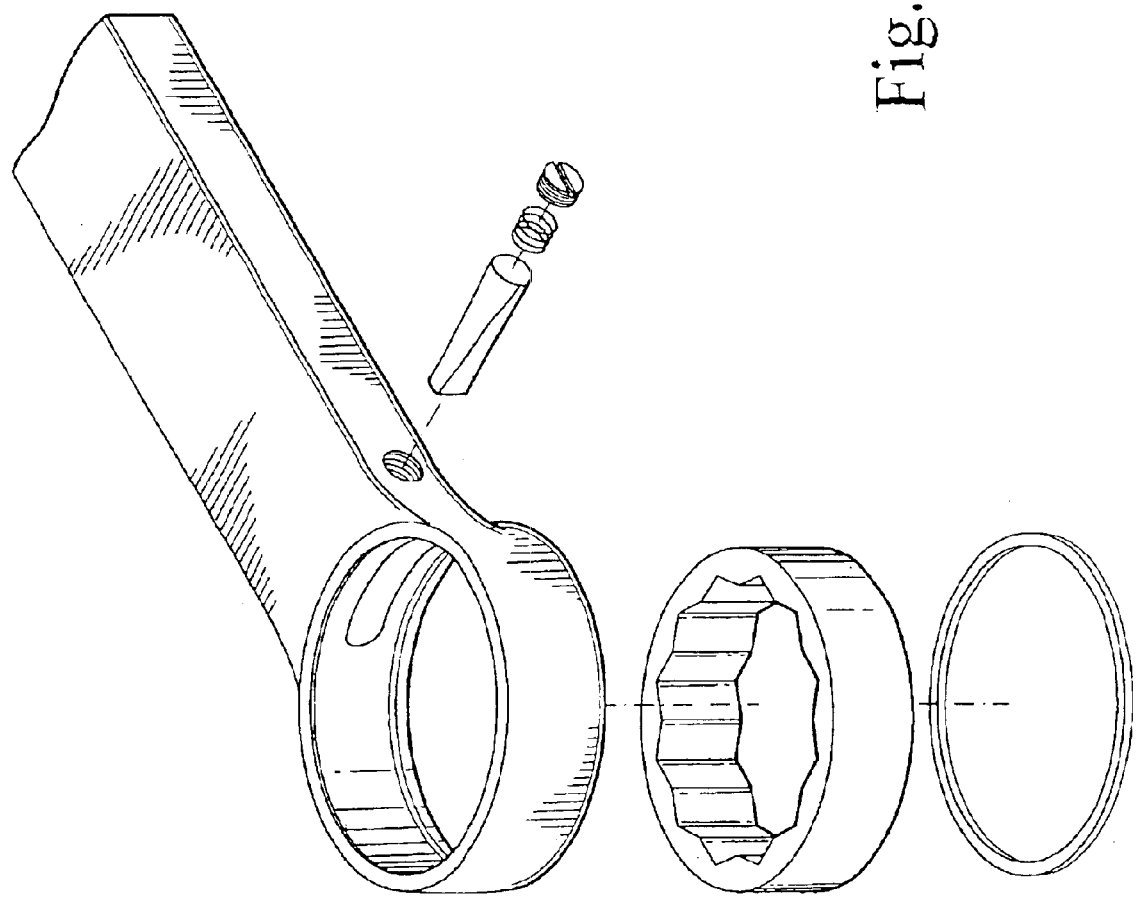
FIG. 2 is an exploded perspective view of a wrench produced by the wrench manufacturing process.

9. In the step of thermal treatment, the structural toughness and hardness of the roughcast are increased so that they can support the stress caused by twisting a fixed object.
10. In the step of vibrating, a chemical vibration means is used to make the surfaces of the roughcast become finer and suitable for being electroplated.
11. In the step of electroplating, a protective layer to resist oxidation and attrition covers the whole surface of the roughcast.
12. In the step of CNC cutting or MC fine cutting, the slight deformation of the roughcast caused by the thermal treatment is removed so that the receptacle space thereof fits the required degree of roundness, and the inner wall of the receptacle space is left with fine tool marks for providing a better frictional effect with a set of parts to be installed therein.
13. In the step of assembling, a part set, after firstly being assembled, is coupled with the receptacle space and is locked by a locking member. The wrench thereby formed is shown in FIG. 2.

The wrench manufacturing process aforesaid includes additional steps of thermal treatment and CNC or MC fine cutting. The thermal treatment enhances the structural toughness of the wrench so that it can resist high stress when it is applied to twist a fixed object. The CNC or MC fine cutting eliminates the deformation of the receptacle space from a perfect circle caused by thermal treatment, so as to assure required high degree of roundness. A wrench thus formed is for using with a ratchet wheel without ratchet teeth. Since the holding strength of a skewed blocking piece is not sufficient, additional two steps are induced to enhance not only the toughness of the wrench body but also the roundness of the receptacle space that receives the ratchet wheel. The tool marks left from CNC or MC fine cutting further improve the frictional effect between the inner wall of the receptacle space and the outer wall of ratchet wheel.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wrench manufacturing process, comprising the steps of:
    (a) forming a roughcast of the wrench by means of thermal forging;
    (b) annealing said roughcast of the wrench so as to soften the roughcast to facilitate subsequent processing;
    (c) performed a rolling process; namely to rub said roughcast of the wrench against sand granules in a rolling barrel, so as to remove carbide materials attached on said roughcast during said step of annealing;
    (d) shaping said roughcast of the wrench to a predetermined shape;
    (e) CNC rough cutting, whereby a receptacle space in a front section of said roughcast of a wrench is cut to attain a predetermined size;
    (f) cutting a receptacle space in a front section of said roughcast of the wrench to has a predetermined size by CNC rough cutting or MC cutting;
    (g) enhancing the structural toughness of said roughcast of the wrench by a heating process so that the structure is capable of resisting the stress caused by twisting a fixed object;
    (h) fining a surface of said roughcast of the wrench by chemical vibrations so that the roughcast is suitable for being electroplated;
    (i) coating said surface of said roughcast of the wrench with a protective layer to resist oxidation and attrition;
    (j) eliminating slight deformations due to said step of thermal treatment, of said receptacle space of said roughcast of a wrench by performing CNC cutting or MC fine cutting so that said receptacle space fits required degree of roundness, and an inner wall of said receptacle space is left with fine tool marks for providing a better frictional effect with a part set to be installed therein; and
    (k) coupling said roughcast of the wrench with said part set within said receptacle space thereof and being then locking said roughcast with said part set by a locking member.

2. The wrench manufacturing process of claim 1 wherein the step (d) further comprises the steps of:
    removing punching holes in said roughcast of the wrench by punching so that the load of subsequent processing is reduced;
    drawing portions of said roughcast of the wrench to be processed a to a predetermined size;
    polishing on said roughcast of the wrench for removing surface irregularities, whereby curved surface portions of said roughcast of a wrench are polished so that all wrenches thereby produced have a uniform outlook; and
    surface grinding a plurality of flat surface portions on said roughcast of a wrench to be CNC processed later by a grinder to a predetermined standard of flatness.

* * * * *